United States Patent [19]

Mashinsky

[11] Patent Number: 5,694,464
[45] Date of Patent: Dec. 2, 1997

[54] AUTOMATED ACCESS TELEPHONE SYSTEM

[75] Inventor: Alex Mashinsky, NY, N.Y.

[73] Assignee: Snip, Inc., Carson City, Nev.

[21] Appl. No.: 369,376

[22] Filed: Jan. 6, 1995

[51] Int. Cl.$^6$ ........................................... H04M 1/00
[52] U.S. Cl. ..................... 379/355; 379/220; 379/221; 379/354
[58] Field of Search ............................ 379/354, 355, 379/357, 221, 245, 112, 113, 196, 197

[56] References Cited

U.S. PATENT DOCUMENTS

| | | | |
|---|---|---|---|
| 4,266,098 | 5/1981 | Novak | 379/77 |
| 4,313,035 | 1/1982 | Jordan et al. | 379/207 |
| 4,332,985 | 6/1982 | Samuel | 379/354 |
| 4,649,563 | 3/1987 | Riskin | 379/97 |
| 4,706,275 | 11/1987 | Kamil | 379/144 |
| 4,817,135 | 3/1989 | Winebaum | 379/355 |
| 4,882,750 | 11/1989 | Henderson et al. | 379/355 |
| 4,980,910 | 12/1990 | Oba et al. | 379/355 |
| 5,136,632 | 8/1992 | Bernard | 379/91 |
| 5,182,767 | 1/1993 | Bernard | 379/355 |
| 5,343,519 | 8/1994 | Feldman | 379/355 |

OTHER PUBLICATIONS

Computer print out of United States patent abstracts (42 sheets).

*Primary Examiner*—Krista M. Zele
*Assistant Examiner*—Jacques M. Saint-Surin
*Attorney, Agent, or Firm*—Pennie & Edmonds LLP

[57] ABSTRACT

Computerized switching system a method of connecting a caller and a called party or target by a manual or automated dialer by informing a control station of a PIN or ID number and optionally the service type, and having the call routed based on pre-programmed numbers provided by the called party. The call is routed to a destination that may be based on many factors, including the hour of day, priority of call, service type, destination and origination of caller and other programmed commands. The called party has the ability to administer the routings and direct all call flows, including destination, scanning originator, time, etc. A dialer service pre-programmed with access and PIN numbers may be used to automate these procedures.

13 Claims, 7 Drawing Sheets

AUTOMATED ACCESS TELEPHONE SYSTEM

BACKGROUND OF THE INVENTION

1. Field Of The Invention

This invention generally relates to telephone systems, and, more particularly to an automated access system pre-programmed to route a call or provide a specific class of service as a function of a PIN or ID number dialed by a caller.

2. Description Of The Prior Art

A wide range of telephone connectivity exists today, including normal calls to remote handsets, to pagers, to mobile or cellular units and others. All of these forms of calling rely on a caller knowing the direct destination telephone number of the called or target party. For a wide population, including children, disabled people, the caller has no ability to dial or know where the party called is located. In some instances, the target or called party may not be accessible or may not be interested or be in a position to receive the call. Existing systems have also lacked the ability to screen calls 24-hours-a-day, no matter where the called party is located. In fact, existing systems have been deficient in providing called parties the flexibility to control the nature and time of the calls that they receive from specified callers or class of callers.

By way of example only, U.S. Pat. No. 4,817,135 discloses a pre-programmed automatic dialing device intended to enable consumers to automatically dial pre-programmed numbers associated with one or more sources of goods and/or services. While the dialing device is capable of dialing a target number, as are all portable dialers of this type, the Patent does not disclose an automated access system which provides the called or target party flexibility to modify or in any way control the class of service provided to the caller, or reroute the calls that are routed to him or her.

In U.S. Pat. No. 4,882,750, a programmable dialer system is disclosed which is a low cost dialer without a key pad, so that the dialer is small and inexpensive and it can be given away as a "give-away" item. The dialer, however, as in the previous patent, can only be used for dialing a target number and the patent does not disclose a system for providing any routing flexibility.

U.S. Pat. No. 5,136,632 discloses a telephone dialer in the form of an emitting token. While the patent discloses a management computer, the objective of the disclosed invention is to provide a telephone service payment system for use in conjunction with placing of bets by telephone.

In U.S. Pat. No. 5,182,767, an electronic telephone device is disclosed which does not include a keypad, but a single button, and is programmed to dial a pre-determined number. The device is primarily concerned with being able to "self destruct" when the period of validity has expired or when a set time limitation date has been reached so that the device is rendered ineffective and taken out of service.

In U.S. Pat. No. 4,980,910, a portable automatic dialing unit is disclosed which does includes a keypad and is intended to operated in one of two modes of operation. In the first mode, it includes a registered target number, and in the second mode it includes data for special telephone services. While the dialer can transmit access codes through the telephone lines in addition to passwords and special service numbers, the device is primarily concerned with the ability to insert target telephone numbers in dial data for special telephone services. Also, the dialer is concerned with transmitting entire dial programmable destination, not service data whether the call is a general long distance call or a long distance call through special telephone service and can be serviced by any carrier such as by AT&T or MCI.

U.S. Pat. No. 4,313,035 teaches a system for re-routing calls, frequently referred to as "person locator services". These services were established primarily for use with dating services where the dialing of a central number and PIN number allow a call to be made to a given target telephone without knowing the telephone number of the target. Such a system is a form of call forwarding service, in that the target or called party establishes a PIN number that can be used by more than one caller to access the target party at an established number or a re-routed number and to permit the calling party to receive status messages or make collect calls. While the PIN number assigned to a target subscriber may not be unique to that subscriber it does, in effect, become unique to a given subscriber when correlated by the system with a unique Personal Locator Number (PIN).

U.S. Pat. No. 4,266,098 discloses a device for automatically screening incoming calls. However, this involves the use of a caller ID screening device that must be viewed to see a display. Therefore, this patent discloses a conventional method of screening calls based on the use of a screening device attached to the receiving.

U.S. Pat. No. 4,649,563 discloses method and apparatus for accessing computerized data bases using touch-tone telephone equipment, the patent disclosing a system that makes use of ANI or PIN identification codes for purposes of callback.

In U.S. Pat. No. 5,343,519, an autodialer is disclosed which includes a button for generating a PIN code, in order to avoid manual entry which may result in an unscrupulous observer memorizing the code. The autodialer is intended to be used in lieu of manual actuation of the keys in a telephone keypad. However, the autodialer works with any telephone system and is used to make conventional calls to any desired target telephone number.

SUMMARY OF THE INVENTION

Accordingly, it is a primary object of the present invention to provide an automated access system which can be conveniently used with a public or private telephone network.

It is another object of the present invention to provide an automated access system which can be used with automatic portable dialers for targeting one or a plurality of pre-programmed or user selectable target telephone numbers and/or classes of service.

It is still another object of the present invention to provide a automated access system which can be useful for use by small children or physically handicapped people who need to call their home or an emergency number.

It is yet another object of the present invention to provide an automated access system which provides the target or recipient of the call flexibility in screening, taking or refusing to accept a call or re-routing same as a function of a PIN or ID number unique to a caller or class of callers.

It a further object of the present invention to provide an automated access system, as in the previous object in which the target or recipient has the flexibility to modify the instructions for routing the calls addressed to him or her for a given PIN or ID number of a caller or class of callers.

It is still a further object of the present invention to provide an automated access system of the type suggested in the previous objects, which enables automated conferencing or call back conferences between a caller and a target or recipient of a call after the initial call by the caller is terminated.

In order to achieve the above objects, as well as other which will become apparent hereinafter, an automated access system in accordance with the present invention for use with a central station of a telephone network comprises a control station having a pre-determined access telephone number. An optional dialer having a first storage means may be used for storing at least one telephone access number and at least one dialer identification number (ID) or personal identification (PIN) is provided. Manual switch means is provided for selectively actuating said dialer, and having tone signal generating means for converting said telephone access and I.D. numbers into DTMF or other tones upon actuation of said switch means for acoustically coupling said access and ID numbers into a handset of a telephone unit of the telephone network for communicating said numbers to the central station and connecting the caller telephone unit with said control station. Said control station includes second storage means for storing a programmed set of instructions, and routing means for routing the call or calls as a function of the programmed set of instructions, specifically a class of service or manner or processing of the call, for a received caller ID. The functions of the dialer, however, may be replaced by manual dialing by the caller on the calling telephone unit.

The method in accordance of the present invention, for use with the central station of a telephone network, comprises the steps of coupling telephone access and caller ID numbers into a handset of a caller telephone unit of a telephone network for communicating said numbers to the central station and connecting the caller telephone unit with a control station that includes a data base of programmed, and subscriber reprogrammable, instructions for processing a call based on the ID or PIN received by the control station from the handset of the caller telephone unit. The calls are routed as a function of the pre-programmed set of instructions stored at a control, station for a received caller PIN or ID number to provide a class of service or services, including re-routing of calls, and which can be modified at least by the subscriber call recipient or target of the call to change the handling of the incoming call as a function of the caller's ID or PIN number.

BRIEF DESCRIPTIONS OF THE DRAWINGS

The above and other objects features, aspects and advantages of the present invention will become more apparent in the following detailed description of the present invention, when taken in conjunction with the accompanying drawings.

DESCRIPTION OF THE PREFERRED EMBODIMENT

Referring now specifically to the drawings, in which identical or similar parts are designated by the same reference numerals throughout, the system in accordance with the present invention is generally designated by the reference numeral 10.

The system 10 is for use with a central station of a telephone network, as to be described.

Figures 1, 4:
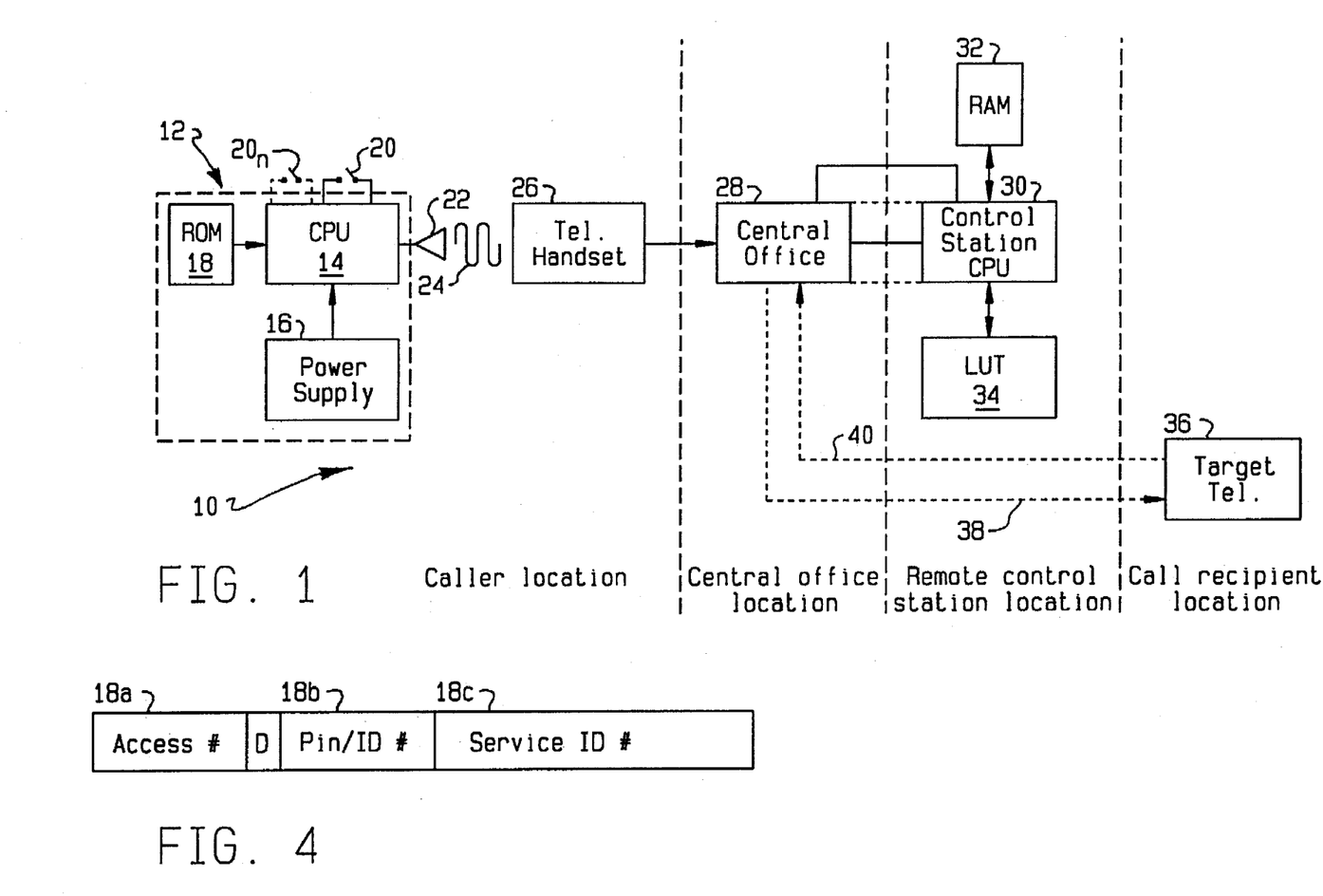
FIG. 1. is a generalized block diagram illustrating the major components of the system in accordance with the present invention.
FIG. 4. is a layout of a data stream that can be stored in the portable dialer for accessing the system.
Figures 2, 3:
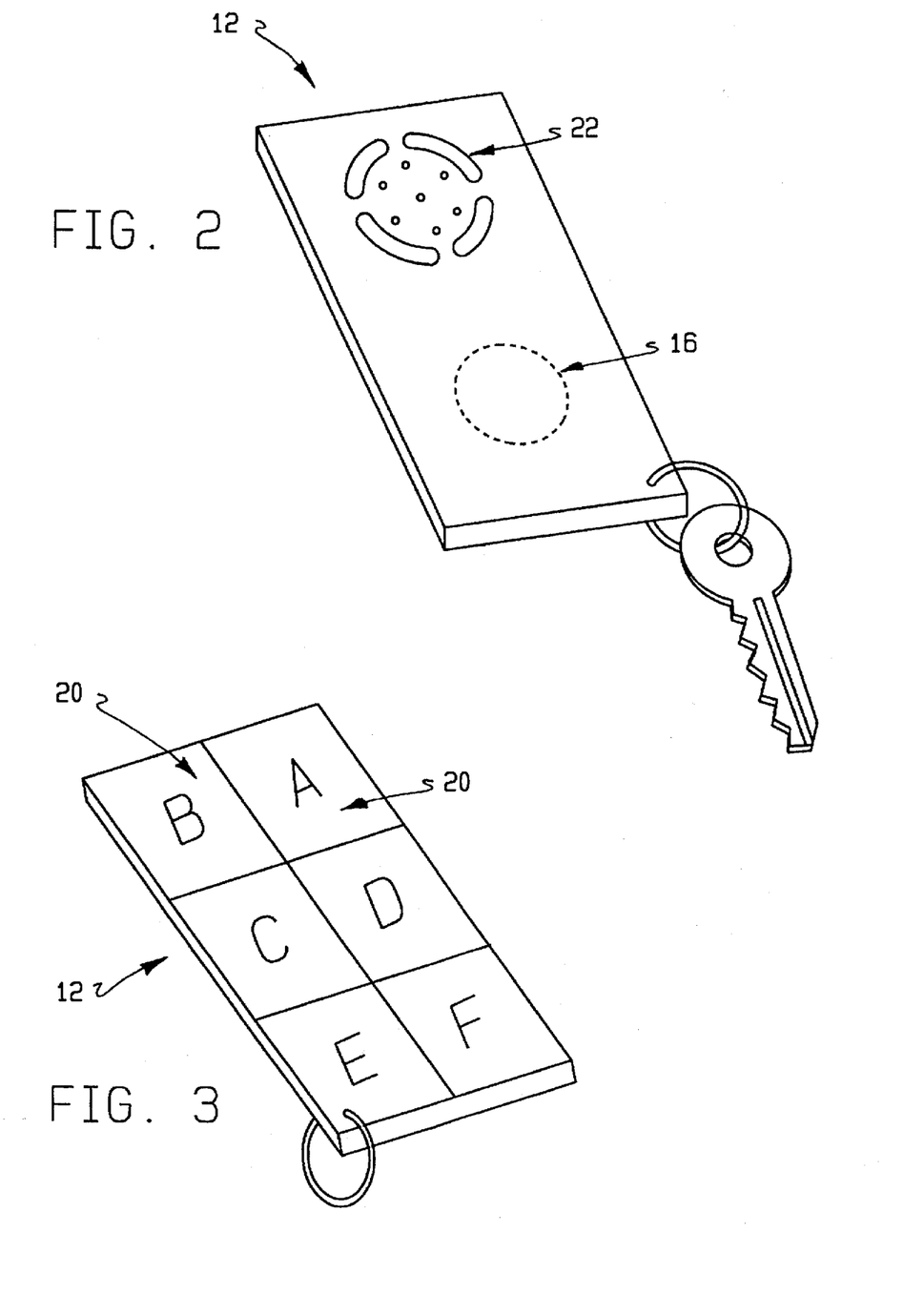
FIG. 2. is a diagrammatic view of a portable dialing unit in accordance with the present invention, illustrating the DTMF emitter for use in conjunction with a handset.
FIG. 3. is a similar to FIG. 2. but showing the reverse side of the dialing unit to illustrate the push button switches that can be used with the dialer.

One optional component of the system 10 is a portable automated dialer 12 which includes a CPU or microprocessor 14 powered by a power supply 16, typically a battery. The CPU 14 has associated therewith a storage or memory device, typically in the form of a ROM 18, in which data is stored. As indicated in FIGS. 1 and 2, the CPU 14 is connected to a sound producing device 22 which is used to generate a sequence of acoustic tones corresponding to information in the ROM 18. At least one manual switch 20 is provided for selectively actuating the dialer 12. However, as suggested by the phantom outline of the switch $20_n$, two or more such switches can be used in conjunction with the dialer, as illustrated in FIG. 3. The same function can be achieved with a single switch on the dialer that is sensitive to multiple actuations within a preset period of time or to dial different combinations of access and ID numbers.

The data contained in the ROM 18 is exemplified in FIG. 4., in which the data is shown to consist of a sequence including an access telephone number 18a and a PIN or caller ID number 18b. The data stored in the ROM can also comprise an optional service ID numbers 18c. The CPU 14 is programmed to include a tone signal generating means for converting the telephone access and ID numbers 18a, 18b, into DTMF tones 24 (FIG. 1) upon actuation of the switch 20 for acoustically coupling the numbers stored in the dialer into a handset 26 of a caller telephone unit of a telephone network and for communicating this information to a central station 28. This has the effect of connecting the caller handset 26 with a control station 30.

The control station 30 includes a storage or memory shown in the form of RAM 32 or other storage medium for storing a data base of programmed instructions. The control station 30 also includes means for routing the incoming call from the central office 28 to a target telephone unit 36 as a function of the programmed set of instructions and received caller ID over an incoming communications link 38. Also illustrated in FIG. 1. is an auxiliary going link 40 for connecting the remote target telephone unit to the central office 28 so that the call recipient may access the control station 30 through the central station 28 to modify the programmed instructions at the control station 30. The links 38 and 40 may be a single communication path. It is possible to combine the functions of the central office 28 and control station 30 so that they are all performed by one unit, or the separate units 28, 30 can be stationed at the same location.

In addition to the memory or storage of device 32 in the form of a RAM memory, an optional look up table LUT 34 may be used in conjunction with the control station 30 to facilitate the routing of incoming calls as a function of the caller ID numbers and/or any supplemental service ID numbers 18c. Where the dialer 12 has more than one switch $20-20_n$, each switch is arranged to initiate the dialing of one of a plurality of access numbers and/or one of a plurality dialer ID or PIN numbers. The dialer 12 can be programmed, to always dial the same access telephone number 18a (FIG. 4) while providing different PIN ID numbers for each separate switch A–F. Alternatively, different access numbers may be used in conjunction with the same or different PIN or ID numbers when more than one control station 30 is used.

It will be appreciated that the remote call recipient location 36 may be a telephone voice receiver unit or may be a pager or voice mail box or the like. The specific target used in connection with the invention is not critical and the system provides significant flexibility in the manner in which the calls are routed and processed. The control station 30 CPU can also be programmed to initiate alternate routings in the event that the initially programmed routings do not connect.

With touch tone dialing, the central office 28, which may be located in the United States, can be accessed by a user anywhere in the world by generating the appropriate international country code. Such codes can either be manually entered on the telephone unit prior to actuations of a switch $20-20_n$ or may be used to initiate an international dialing code, so that the access number 18a in FIG. 4 can consist of two strings of digits generated by depressing two of the switches in the proper order. If the dialer is to generate the international country code to access circuit 28, the ROM 18 must be programmed to be country specific as to where the dialer will be used since many countries have their own distinct country and routing codes. The CPU 30, in accordance with well known techniques, is also preferably programmed to maintain billing information including debiting of the account of the caller of the cost of the call or limiting the lengths of the call as a function of a pre-determined payment plan or remaining credit balance. The control station CPU 30 can also be programmed to store information in the RAM 32 or the LUT 34, to perform different routes or handle incoming calls in different ways as a function of the day of the week that the call is made, or the time of day that the call is made. Such restrictions or modifications in the routing are preferably modifiable by accessing the control station CPU. It is presently contemplated, in accordance with the presently preferred embodiment, that such modifications to the programming can be effected by the call recipient or target of the telephone call by means of an incoming link 40 which permits the recipient of the call to access the control station 30 by way of the central office 28. Using appropriate ID codes and/or authorization codes, the routing information in RAM or in the LUT can be modified quickly, easily and conveniently remotely by phone for voice action with a terminal. Thus, for example, the system can be used in the form of a network (such as a "psychic" network) in which distributed targets or call recipients log into the system. Any registered user that "logs in" can receive calls that are targeted for the network by a predetermined PIN or ID number. The system can be programmed to route such as incoming call to one of the logged-in agents that are part of the network.

Figure 9:
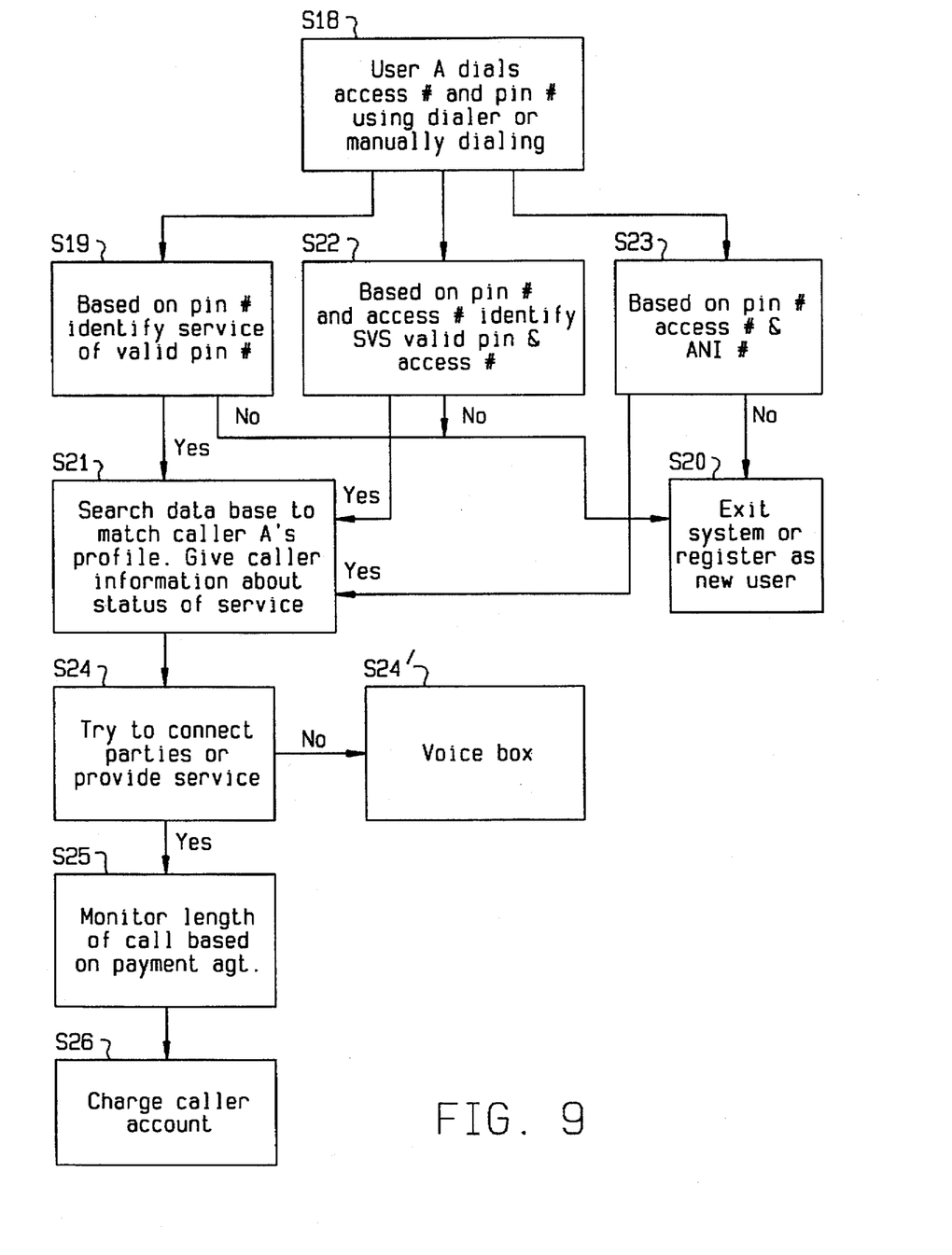
FIG. 9. is a block diagram illustrating a dating or psychic service utilizing the present invention.

Referring to FIG. 9, there is shown a block diagram that illustrates a service utilizing the invention which can be used for a number of different applications, including a dating or a physic service network. At S18, the user A dials an access number and PIN number by manually dialing these numbers or using the automatically dialing device. The inputted information, which is transmitted to the control station 30, is checked to determine the caller's PIN or ID number. If the PIN or ID number cannot be identified as a valid number, the call is terminated at S20 and the system is exited. Alternatively, if an invalid PIN or ID number is entered, the caller may be prompted to again attempt to input those numbers in the event that the numbers were inadvertently mis-dialed. At S22, it will be noted that the control station 30 can be programmed to make the initial determinations based on the n number of different programs that test the parameters. Thus, the initial data dialed by the caller may be checked whether a valid PIN, and access numbers have been dialed, as well as possibly as some other identifying code which identifies a specified service. Again, if the data is validated, the system proceeds to step S21. Otherwise, the system exits at the S20. Similarly at S23, the system can be programmed to check the validity of a PIN number, access number and ANI number. The same checks can be made with attendant exit from the system at S20, or continuation with processing of the call at S21.

Once appropriate verification has been made at steps S19, S22, S23, the system switches the data base to match the caller A's profile to give the caller service information about the status of the target or subscribing party or direct the call to a voice box. At S24, the system tries to connect the parties to provide the service to the caller as requested and as permitted by the pre-programmed instructions by the subscribing target. If the caller cannot be connected to the target party, the system can revert to step S21 to suggest leaving a message in a voice box for the called party. Beyond step S24, demonstrated functions can be performed by the system. Thus, at S25, the length of the call can be monitored and terminated, if necessary, based upon payment arrangements. At S26, the caller may be given the option, if no prior payment arrangements have been made, to charge the caller's account, such as a credit card or the like.

A party that would like to be reached at any time can simply dial 28 and enter an ID and service type and all callers trying to reach that party will be automatically routed to that ANI number if they or their ANI number fits the service type stored in the data base 32.

Referring to FIG. 4, the present invention also contemplates the dialer 12 to create a delay D between the dialing of the access telephone number and the PIN or ID number 18b to permit the call to be completed by the central station before the PIN or ID number is transmitted to the control station CPU 30. In this manner, the generation of the PIN or ID number 18b can be communicated directly to the control station CPU 30. In place of a delay D the system can be programmed to detect a "completion signal" emitted by the control station 28 after the access member 18a has been transmitted. The dialer 12, for example, can be provided with an acoustic microphone or other detection device for detecting the "completion signal" before it generates and transmits the PIN or ID number 18b.

The method of the present invention includes manually actuating the conversion of stored data, as aforementioned, corresponding to a telephone access number and a caller ID number, into DTMF tones. The tones are coupled into a handset of a caller telephone unit of a telephone network for communicating the numbers to the central station, and connecting the caller telephone unit with a control station. The calls are routed as a function of a programmed set of instructions at the central station for a received caller ID. The method of the present invention also contemplates the limiting the length of the call as a function of a pre-determined payment plan or credit balance on the dialer unit.

While the preferred system in accordance with the invention uses a dialer 12 as aforementioned it will be appreciated that a dialer unit is not absolutely essential to practice the invention since the access number 18a and PIN or ID number 18b can be manually entered on a keypad of the calling phone unit. The control station 30 is provided with data storages 32, 34 which direct an incoming call to a particular level of service, or routes the call as programmed for the given caller PIN or ID number received by the control station. As suggested above, the system has numerous applications which have not before been possible. With this system, for example, a company that provides telephonic technical assistance for their product(s) can monitor and control the extent that any one customer has used of the service. Since some customers make excessive use of such services companies can, with this system, offer a limited period of time for obtaining technical support, a period that can be specified in the documentation provided with the product. The control station 30, upon receiving a call with a PIN or ID number signifying that a technical service call has been made to a subscribing company, can check its memory bank 32 to see if a given customer has already duplicated the allotted free time. If not, the balance of the time is prompted and the call is routed to the technical support group of the subscribing company. If the allotted time has been reached, the call is blocked unless other suitable arrangements have been made with the subscribing company or with operator of the control station 30 (e.g., accepting a credit card number for payment).

One feature of the present invention is the use of the RAM 32 to record the "Automatic Number Identification" caller ID (ANI) number. After the ANI number is generated by the central office and recorded in RAM 32, the caller or originator of the call can hang up the handset 26. The control station 30 can then readily conference the caller with a target telephone number at 36 in accordance with pre-programmed instructions after the caller hangs up.

Figure 5:
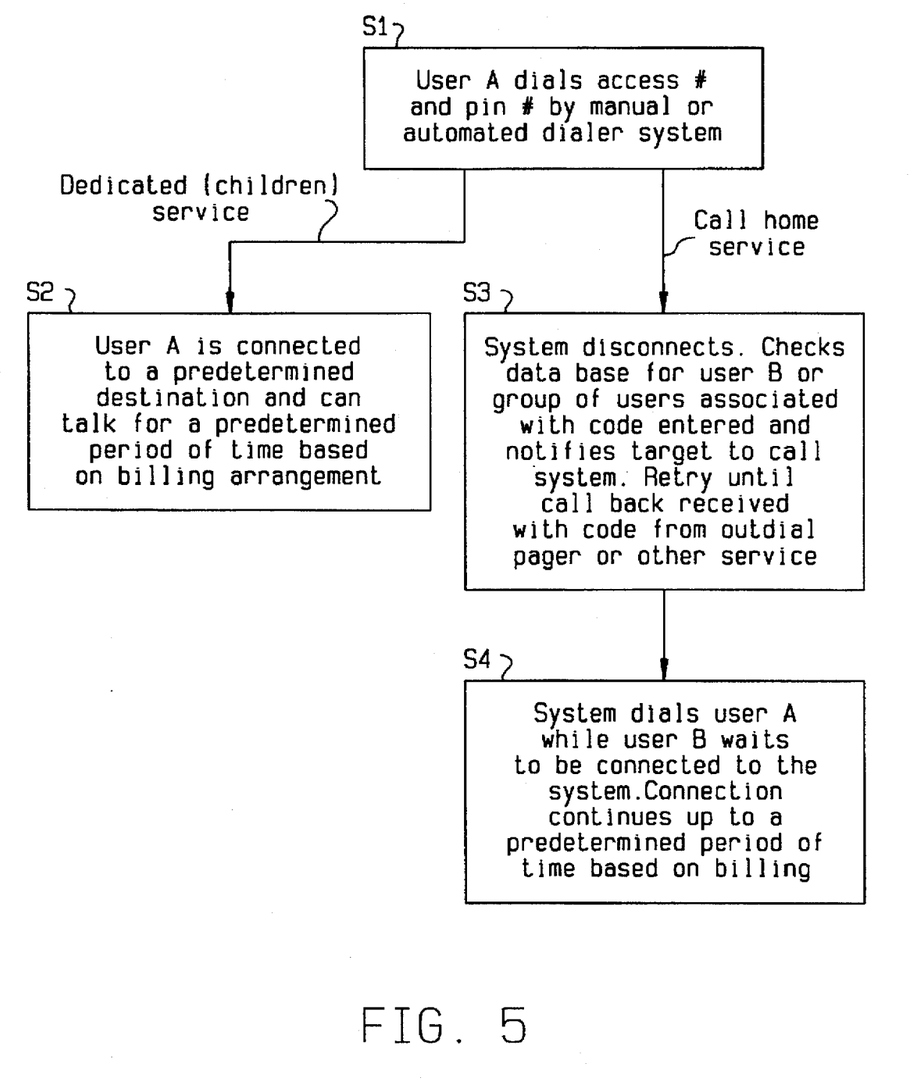
FIG. 5. is a block diagram illustrating one mode of utilizing the system of the present invention.

Referring to FIG. 5, a generalized flow chart of the operation of the present invention is shown. At S1, a user dials an access number and PIN as aforementioned, by a manual or automated dialer system based on service type as appears in the system data base. One form of service, particularly useful for use by children, the user is connected, at S2, to a pre-determined destination and can talk for a pre-determined period of time based on a billing arrangement. For a "call home" service, for example, the system disconnects, at SS3, at which time the system checks the data base to determine the target user or group of users associated with the code entered in memory, and notifies the targets of the call of their need to call the system. The system will try again and again until the targets dial the access number and code ratification by an outdial telepager or other available services. At S4, the system dials the caller while the recipient or target waits to be connected to the system and, once the parties re connected, lets the parties talk for a pre-determined period of time based on the billing arrangement. This way, a party that would like to be reached at any time can simply dial 28 and enter an ID and service type and all callers trying to reach that party will be automatically routed to that ANI number if they or their ANI number fits the service type stored in the data base 32.

Figure 6:
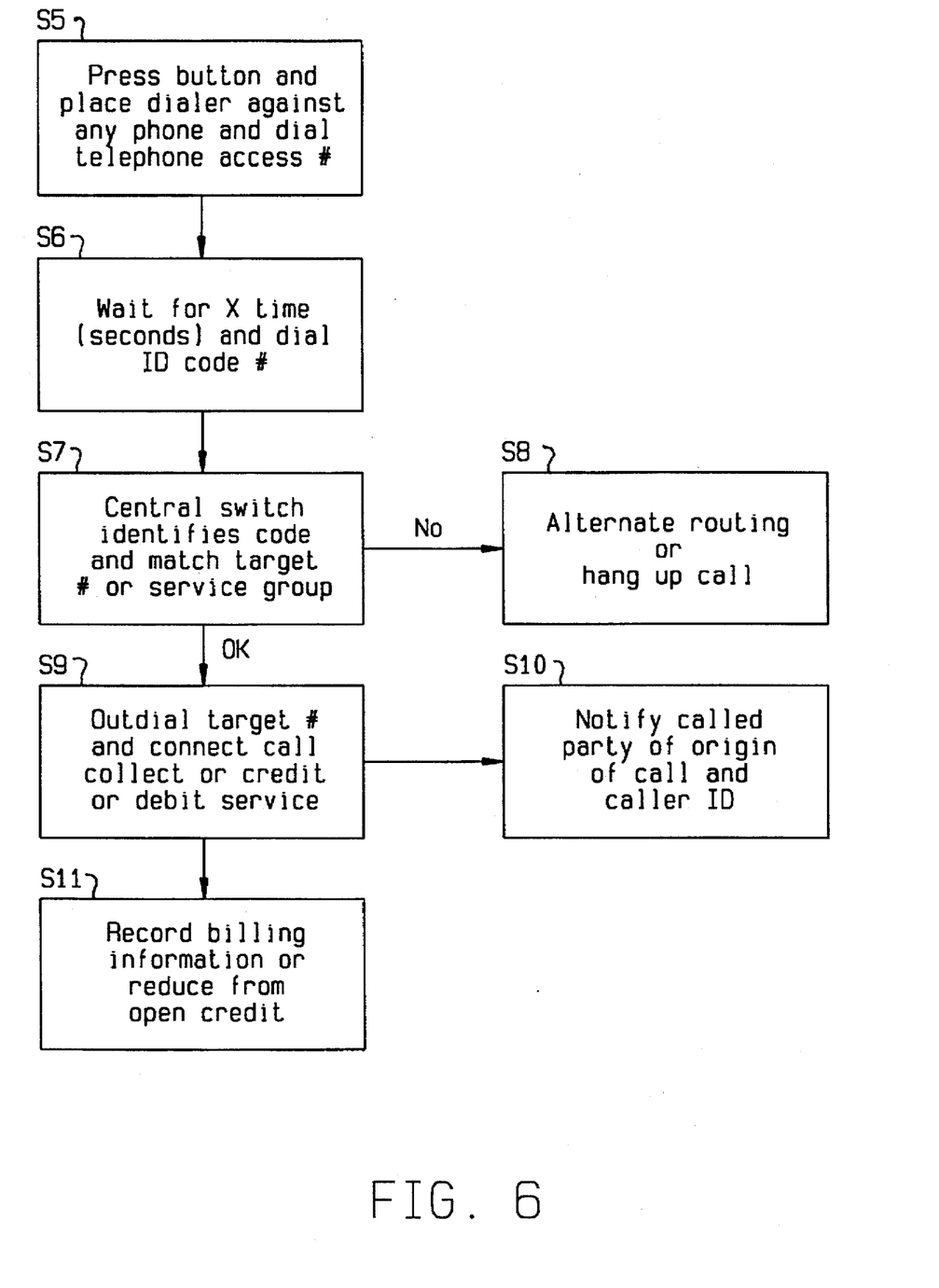
FIG. 6. is a further block diagram illustrating the use of the system in connection with one specific application, namely for use by children to access their home or an emergency telephone number.

In FIG. 6., an arrangement to the present invention particularly useful for use by small children is shown. At S5, a caller, normally a small child, presses the button or switch on the dialer against any phone handset to dial an access number. At S6, the dialer converts the stored data into acoustical DTMF tones and waits for a pre-determined period of time before it dials the ID code or caller number. This delay, as aforementioned, is for the purpose of allowing the central office to complete the call to the control station so that the caller ID or ID code number can be transmitted directly to the control station CPU 30. At S7, the central switch identified the code and matches a destination number or service group from the RAM 32 or LUT 34. If a match cannot be made, an alternate routing is initiated at S8, or the system hangs up. If a match is made, a destination number is dialed at S9, and the call is connected to the call recipient location 36. Collect, credit or debit service is determined and the call is controlled and billed accordingly. Optionally, at S10, the called or target party is notified of the origin of the call and the caller ID. At 511, the billing information is recorded or the course of the call is reduced from an open credit.

Figure 7:
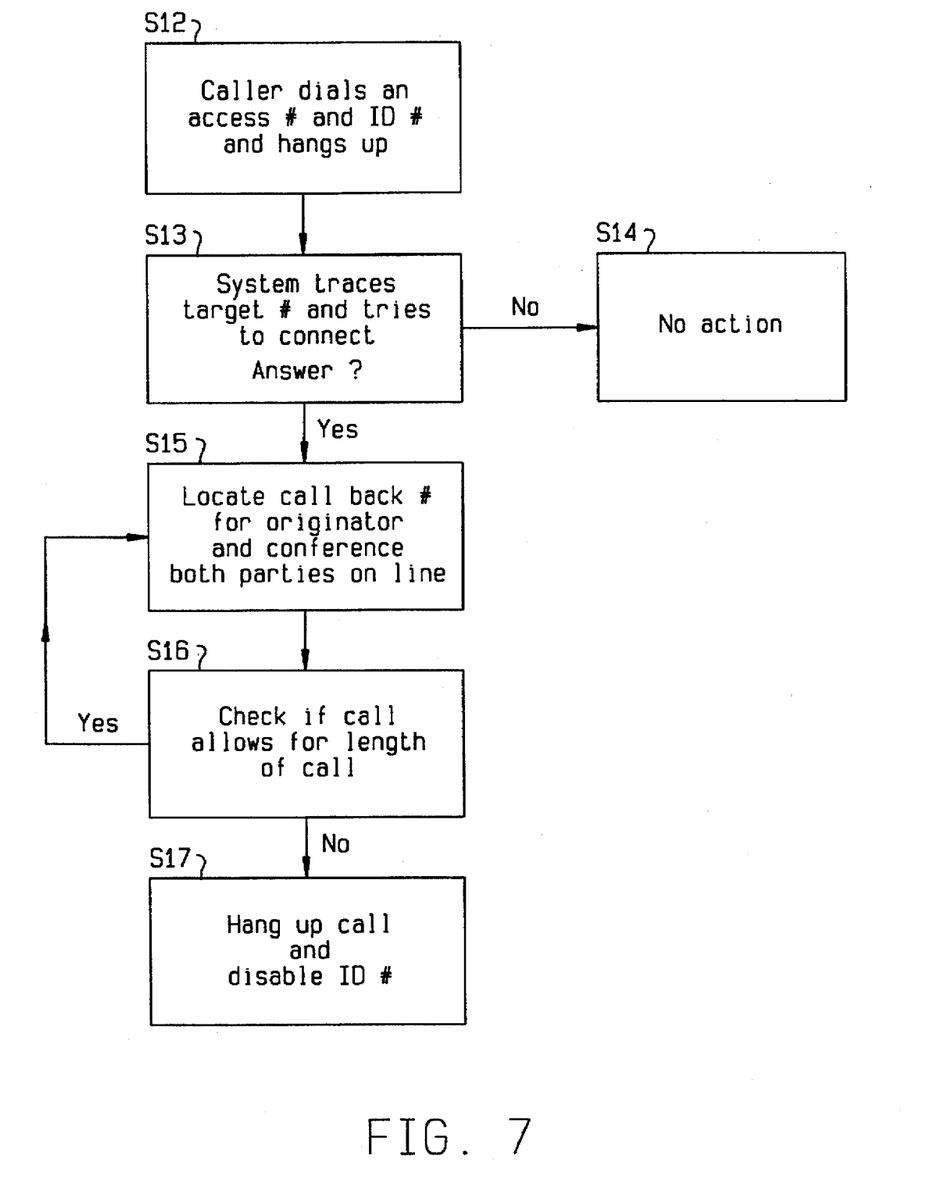
FIG. 7. is a further block diagram illustrating the use of the system for conferencing telephone calls between a caller and recipient or target in accordance with the present invention.

In FIG. 7, another embodiment of the present invention is illustrated in which the caller dials an access number, and an ID number at S12 and hangs up. The system traces the destination number, having recorded the ANI number in RAM 32, and tries to connect the calling and the destination parties. If no such connection can be made at S13, the system hangs up at S14. However, if a connection can be made, the system locates the call back number for the originator from RAM 32 and conferences the calling party and the called recipient or target at 36 at S15. The system then proceeds to check the billing information. This may be done initially during the call. If the system determines that the billing information is satisfactory or if there is still sufficient credit on a debit card, the caller is permitted to proceed at 516. However, if the credit has been consumed and no further billing is possible, the system disables the ID number at 517 in the CPU 30 so that any subsequent incoming calls from the dialer 12 can no longer be handled by the system.

Figure 8:
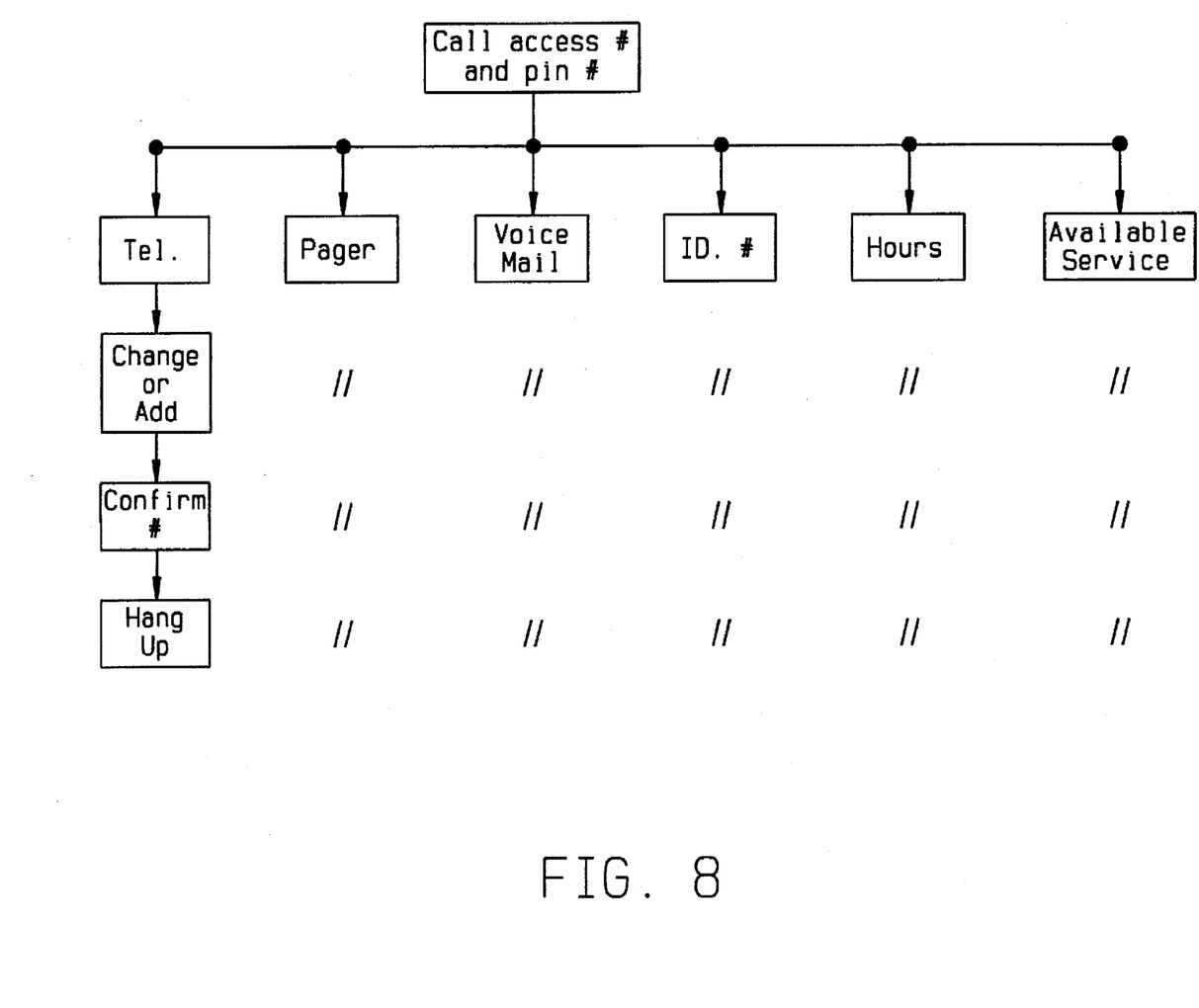
FIG. 8. is a block diagram suggesting the method of administering the system in accordance with the present invention.

In FIG. 8., the flexibility of the system is diagrammatically illustrated. Thus, the control station CPU 30 can be called, via communication link 40, to connect the target or call recipient at 36 to the control station 30. Having accessed an appropriate code or authorization code, the caller can modify the programmed information in the RAM or LUT 34 so as to control future incoming calls addressed to him or her. Different options can be programmed to route incoming calls to a telephone number, a pager number, or a voice mail box number. It should also be clear that an incoming call can also be routed to a facsimile or the like.

With regard to each of the desired routing destinations, the call recipient or system user having the appropriate PIN or authorization code, can change routing telephone numbers, pager telephone numbers and voice mail box numbers or the like. Such numbers can be changed or added or deleted. The system then permits the caller to confirm the changes in the routing requests after which the system hangs up. It is presently contemplated that the call recipient or target of the telephone call will normally be the one that has the capability of modifying the information at the control station 30. The caller, may also, under certain circumstances, access the RAM 32 and LUT 34. The system cannot normally distinguish between which parties call in to modify the routing information. As long as the party has the correct access telephone number and the PIN and/or authorization codes, they can modify the routing data. It is presently contemplated, however, that the callers or originators of the call be provided with "dedicated" dialers 12 and have limited control over the system, namely to place calls using their pre-programmed dialers. The call recipients, such as the parents of small children, however, can modify the routing information so that a child using the dialer 12 can reach the parents regardless of where the call recipient location is moved to, as long as the call recipient or target changes the stored routing numbers in the control station 30 when they change their positions or locations. Thus, while the data base stored in memory 32 may manually be reprogrammed at will by a subscriber who randomly moves about with no specific pattern, the system can also be programmed to automatically modify the routing sequences when the routing sequences are to be repeated on a regular basis (e.g., hours of the day and/or days of the week). In some cases, an additional button on the dialer may be used as an access and password to the control station 30 to update or modify the routing instructions or services offered for the ID or PIN number. This feature may be useful, for example, in allowing a child to reach a parent that spends certain hours on weekdays at a place of business and is normally home at other times.

Thus, dialers with predefined access number and a ID or PIN code can be given to disabled people or children and are pre-programmed by the parents to call them at work or other places during specific time frames. A caller may place the dialer to any phone. The dialer will dial via DTMF, the 800, 700, 900 or local access number, pause to allow the central office central service unit to answer, and then dial an identification (ID) code. That code, and the all number identification number (ANI) will allow the central system to identify where and who the call is destined to. At that time any of the following can happen:

1. The call will be routed to a pre-determined or user-selected number and connected for phone conversation.

2. The system will emulate massaging procedure at other remote device and the call will be routed to a pager or other massaging device and the caller will be automatically connected to a pager, fax or other service when the destined party is logged into the system.

3. The caller stays on line while the system attempts to trace the destination party.

4. The caller completes the call and enters the ID number and originating number and hangs up. The system traces the destination number and connects the caller.

5. A truck driver identifies his location by an 800 number ID and ANI which allows his company to know exactly where a shipment is by updating the data base of the company.

6. A caller may use the dialer to automate access and identification into the system that will then allow him or her to place calls or get other services.

It is clear that the present invention provides value added communications to common carrier network services and service providers that can provide various telecommunication services to the public at large in the United States and in other countries. The invention can be used to originate a telephone call, without having the originating telephone line number charged for the call and without having to deposit monies in a public coin phone instrument, commonly referred to as "sent-paid" call, or without having to pay for the call at a later date by charging the call to a telephone credit card, bank card or similar device, commonly referred to as "non-sent paid" call, whereby the public can access this service by dialing an access number from any telephone, using DTMF signaling from a portable dialer or manually, enter a specific account code or PIN number provided the originating calling party has entered a valid PIN number and the account represented by the PIN has sufficient credit standing to be allocated to the use of the service, as determined by the control station. If the calling party enters a valid destination ID, the system will attempt to complete the service to the number entered by the calling party.

As it should be clear, the system can be used with only one single destination number programmed. However, multiple numbers can be stored in the system. For local calls no further steps need be taken by the caller with the exception of pressing the button or switch of the dialer. For long distance and international calls, the caller need only dial an area code or an international prefix codes or press ID on dialer to automatically call an International access number, ID, and service type.

An attractive feature of the present invention is, as suggested, is that it can be used by children from any telephone without the need to remember long telephone numbers and without the need to use money or credit cards. Also, because the completed calls are on a toll free number to the control station, the control station can connect at the lowest routing rates. The cost of the service can aim be minimized and expensive call surcharges from some carriers can be avoided. Also, the problems of fraud and theft are eliminated. If the portable dialer is lost, it is useless to others because it is only programmed to call a dedicated number, such as a number of the home of the person that lost it. It cannot be used for making general telephone calls to any telephone numbers other than the ones that have been pre-programmed at the control station 30 or selected by the user, and replacement can be issued immediately without monetary loss. Accordingly, the device represents an effective means for avoiding fraud by which is prevalent in the use of calling cards.

Although the present invention has been described and illustrated in detail, it is clearly understood that the same is by way of illustration and example only, and is not to be taken by way of limitation, the spirit and scope of the present invention being limited only by terms of the appended claims.

What is claimed:

1. Automated access system for use with a central station of a telephone network, comprising a control station having a pre-determined access telephone number; a portable dialer for transmitting acoustic signals through the handset of a caller telephone station connected to said central station, said signals including a first series of signals for dialing said pre-determined access telephone number to route and connect a call to said control station, said signals including a second series of signals which represent a dialer ID number and which are transmitted through said handset and through said central station to said control station, said second series of signals being transmitted after said call is connected to said control station, said control station including a CPU associated with a router and a programmed database which includes instructions associated with dialer ID numbers; said control station being configured to receive said second series of signals and in response thereto to route the call to provide a specified service as a function of the instructions associated with the dialer ID number represented by said second series of signals received from said portable dialer, wherein said control station detects the ANI of the calling telephone station and thereafter terminates said call, and wherein said instructions direct the control station to place a second call to a second telephone station having a pre-determined telephone number to detect if the second call is answered, and if it is, to place a third call based upon the ANI of the calling telephone station to connect the second telephone station with the calling telephone station.

2. A system as defined in claim 1, wherein said dialer includes dialer storage for storing information representing said acoustic signals, and a switch for selectively actuating said dialer to transmit said acoustic signals into a hand set of the caller telephone station.

3. A system as defined in claim 2 wherein said switch includes a switch for selectively actuating said portable dialer to transmit said first series of signals and a switch for selectively actuating said portable dialer to transmit said second series of signals.

4. A system as defined in claim 1, wherein said instructions can be modified through a telephone call placed to said control station.

5. A system as defined in claim 4, wherein said programmed instructions are modifiable as a function of a caller's ANI numbers.

6. A system as defined in claim 4, wherein said programmed instructions are modifiable as function of a caller's access number.

7. A system as defined in claim 4, wherein said programmed instructions are modifiable as a function of a caller's dialed number identification service (DNIS) number.

8. A system as defined in claim 4, wherein said instructions can only be modified upon presentation of an authorization code.

9. A system as defined in claim 1 wherein said portable dialer pauses after transmitting said first series of signals before proceeding to transmit said second series of signals.

10. A system as defined in claim 9 wherein said portable dialer paused until an identified response from the control station is received.

11. A system as defined in claim 1 wherein said first series of signals are DTMF signals corresponding to the predetermined access telephone number.

12. A system as defined in claim 1 wherein said portable dialer transmits a third series of signals to said control stations and wherein in response thereto said control station routes the call to provide a service which is a function of said third series of signals.

13. A system as defined in claim 1 wherein said control station and said central station are a single integrated facility.

* * * * *